(12) United States Patent
Baumgaertel et al.

(10) Patent No.: US 9,177,036 B2
(45) Date of Patent: Nov. 3, 2015

(54) EFFICIENT ASSIGNMENT OF QUERY REQUESTS BETWEEN ANALYTICAL ENGINES OF DIFFERING COMPLEXITY

(71) Applicants: Dirk Baumgaertel, Hockenheim (DE); Uwe Schwerk, Heidelberg (DE); Karl-Peter Nos, Nussloch (DE)

(72) Inventors: Dirk Baumgaertel, Hockenheim (DE); Uwe Schwerk, Heidelberg (DE); Karl-Peter Nos, Nussloch (DE)

(73) Assignee: SAP SE, Walldorf (DE)

( * ) Notice: Subject to any disclaimer, the term of this patent is extended or adjusted under 35 U.S.C. 154(b) by 16 days.

(21) Appl. No.: 13/722,982

(22) Filed: Dec. 20, 2012

(65) Prior Publication Data

US 2014/0181005 A1    Jun. 26, 2014

(51) Int. Cl.
*G06F 17/30* (2006.01)

(52) U.S. Cl.
CPC ............................. *G06F 17/30592* (2013.01)

(58) Field of Classification Search
USPC .................................................. 707/602, 708
See application file for complete search history.

(56) References Cited

U.S. PATENT DOCUMENTS

| | | | |
|---|---|---|---|
| 6,397,207 B1* | 5/2002 | Bleizeffer et al. | 1/1 |
| 7,509,671 B1* | 3/2009 | Bedell et al. | 726/6 |
| 7,725,811 B1* | 5/2010 | Bedell et al. | 715/200 |
| 7,814,093 B2* | 10/2010 | Meyers et al. | 707/714 |
| 8,522,192 B1* | 8/2013 | Avalos et al. | 717/100 |
| 2004/0068715 A1* | 4/2004 | Wong et al. | 717/136 |
| 2005/0039033 A1* | 2/2005 | Meyers et al. | 713/193 |
| 2010/0287176 A1* | 11/2010 | Mobbs et al. | 707/765 |
| 2011/0040724 A1* | 2/2011 | Dircz | 707/603 |
| 2011/0313969 A1* | 12/2011 | Ramu | 707/602 |
| 2012/0253997 A1* | 10/2012 | Kovalev | 705/30 |

* cited by examiner

*Primary Examiner* — Kim Nguyen (74) *Attorney, Agent, or Firm* — Mintz Levin Cohn Ferris Glovsky and Popeo, P.C.

(57) ABSTRACT

Runtime performance of report generation and other response to query requests can be improve using a report analyzer that can parse the query request and distribute the necessary analytical task among two or more analytical engines of varying levels of complexity.

17 Claims, 4 Drawing Sheets

EFFICIENT ASSIGNMENT OF QUERY REQUESTS BETWEEN ANALYTICAL ENGINES OF DIFFERING COMPLEXITY

TECHNICAL FIELD

The subject matter described herein relates generally to handling of query requests and generation of reports in response to query requests.

BACKGROUND

Modern business software frameworks (also referred to as business software architectures, business applications, etc.) and other software solutions include or are based on databases, database management systems, or other information retrieval technology. At the core of such services is the ability to reply quickly and accurately to received queries (e.g. a formal statement of information needs) or other request from a user, a consuming entity (e.g. a web service, another software solution or the like that requires access to data), a request for information, requirements to generate reports, etc. In general, a response or result set generated based on a query can be characterized as a report, which can include results of the query in electronic or other formats.

Many modern business software frameworks include one or more complex data models for organizing, accessing, and presenting data. In such architectures, it is common to respond to a request for a report by invoking one or more multidimensional models to generate the requested report. In conventional approaches, this is the default handling of a report request. As an example, the runtime of a business software framework can typically use an online analytical processing (OLAP) engine to calculate report results. However, in cases in which the reporting requirements do not include advanced multidimensional reporting capabilities, use of an OLAP engine or the like can substantially reduce the overall performance of the query response, which can lead to customer dissatisfaction. Examples of reduced performance can include, but are not limited to, out of memory errors, runtime errors, diminished speed in completing tasks, and the like.

In general, the complexity of a reporting request depends not only on the report definition, but also in a way how a user is using the report. The need to use a multidimensional model such as OLAP can therefore vary depending on the requirements of report execution associated with any given report request. Reporting engines are typically built and optimized for the maximal possible feature scope. Accordingly, in actual usage, it is typical that either the performance of reporting solutions is not optimal or the usable analytical functions are limited. For example, implementation of a typical OLAP engine (e.g. Netweaver Business Intelligence available from SAP AG of Walldorf, Germany) can incur a substantial runtime overhead for tasks that can include provisioning OLAP engine meta data, generation of surrogate identifiers (SID), a much deeper call stack (e.g. a stack data structure that stores information about the active subroutines necessary to implement the engine) that would be required without implementation of the OLAP engine, and the like.

SUMMARY

In one aspect, a methods includes analyzing a received query request at runtime to determine a level of analytical complexity required to generate a report responsive to the query request, distributing the one or more analysis tasks among a plurality of analytical reporting engines of differing analytical complexity such that a full complexity analytical engine of the plurality of analytical reporting engines is used only for those of the one or more analysis tasks that require capabilities of the full complexity analytical engine, distributing those of the one or more analysis tasks that do not require capabilities of the full complexity analytical engine to one or more reduced complexity analytical engines of the plurality of analytical reporting engines, and generating the report based at least in part on output from each of the plurality of analytical engines to which the one or more analytical tasks were distributed. The one or more reduced complexity analytical reporting engines include fewer capabilities than the full complexity analytical engine.

In some variations one or more of the following optional features can be included in any feasible combination. For example, the full complexity engine can be an OLAP engine. The determined level of analytical complexity can include an indication of the analytical capabilities required for handling one or more analysis tasks necessary to generate the report. The generating of the report can consume fewer runtime resources than would be consumer were the report generated using only the full complexity analytical engine. The query request can be received from a single user interface via which a user selects a desired set of analytical functions from a presented full range of levels of analytical complexity supported by the plurality of analytical reporting engines. The analyzing can occur without initiating the full complexity analytical engine.

Implementations of the current subject matter can include, but are not limited to, systems and methods including one or more features described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Improvements in performance of business software frameworks consistent with implementations of the current subject matter. For example, performance enhancements in report generation can be realized by avoiding the use of multidimensional models as much as possible. A multidimensional model can be implemented selectively for responding to requests for reports that require more complex analytics and the like. However, for simpler reports, such as for example those that can be characterized as tabular reports (e.g. showing a simple list of data or the like), the higher overhead multidimensional model can be bypassed in favor of a simpler report generator that does not consume as much runtime resources as overhead or initiation costs. In addition to relatively simple reports, other requests for report data can be advantageously met without use of a multidimensional model consistent with implementations of the current subject matter. For example, initial query data to support quick filter functionality (i.e. input displayed on a query to allow a user to easily narrow down results on dynamically on the query page) can advantageously be returned with little or no analytics attached. Providing value help (e.g. a mechanism by which a partial user input in an input field or other input feature of a user interface can be used to offer possible valid values for the input field, typically in a pop-up dialog box or the like) can also be supported by a relatively simple lookup that does to require complex analytics. Newer ways to consume data, such as for example via the Open Data protocol (OData) can similarly have little need for analytical processing by a complex query engine using multidimensional models.

As such, usage of OLAP engines or other multidimensional query response models can advantageously be delayed for as long as possible during execution of a query response. In some case, usage of OLAP engines or other multidimensional query response models can be avoided entirely. Consistent with implementations of the current subject matter, reductions in usage rates of an OLAP engine or other multidimensional query response models can be achieved through one or more of several actions. In general, parameter screen processing can desirably be completed without invoking an OLAP engine or other multidimensional query response model. Additionally, simple reports can be run entirely without the OLAP engine or other multidimensional query response model. More particularly, an OLAP engine or other multidimensional query response model can be replaced for tasks including internal or external conversion of characteristic and key figure values, master data access or offering of value help, parameter screen processing, providing report result data, and the like.

In conventional approaches, dynamic switching between executing a report using an OLAP engine or other multidimensional query response model or without an OLAP engine or other multidimensional query response model is generally not supported. If the two approaches are offered, any given report can typically be executed only using the OLAP engine or other multidimensional query response model or entirely not using the OLAP engine or other multidimensional query response model. Additionally, in cases in which both approaches are available, two separate user interfaces are typically available: one for a "simple" query entry use case and another for a "complex" query use case. The user therefore decides at the outset whether to perform a faster query with no analytical capabilities at all or a more complex query in which the OLAP engine or other multidimensional query response model is invoked at the outset, even if the query to be entered requires such capabilities only for a small part of the query. In contrast, implementations of the current subject matter can provide query functionality covering all available levels of analytical complexity and can make this query functionality available to users via a single user interface. A user is thereby enabled to add as many analytical functions as he or she needs while allowing the report generation runtime to react by using a reporting engine with the minimum necessary complexity to satisfy the query request.

Figure 1:
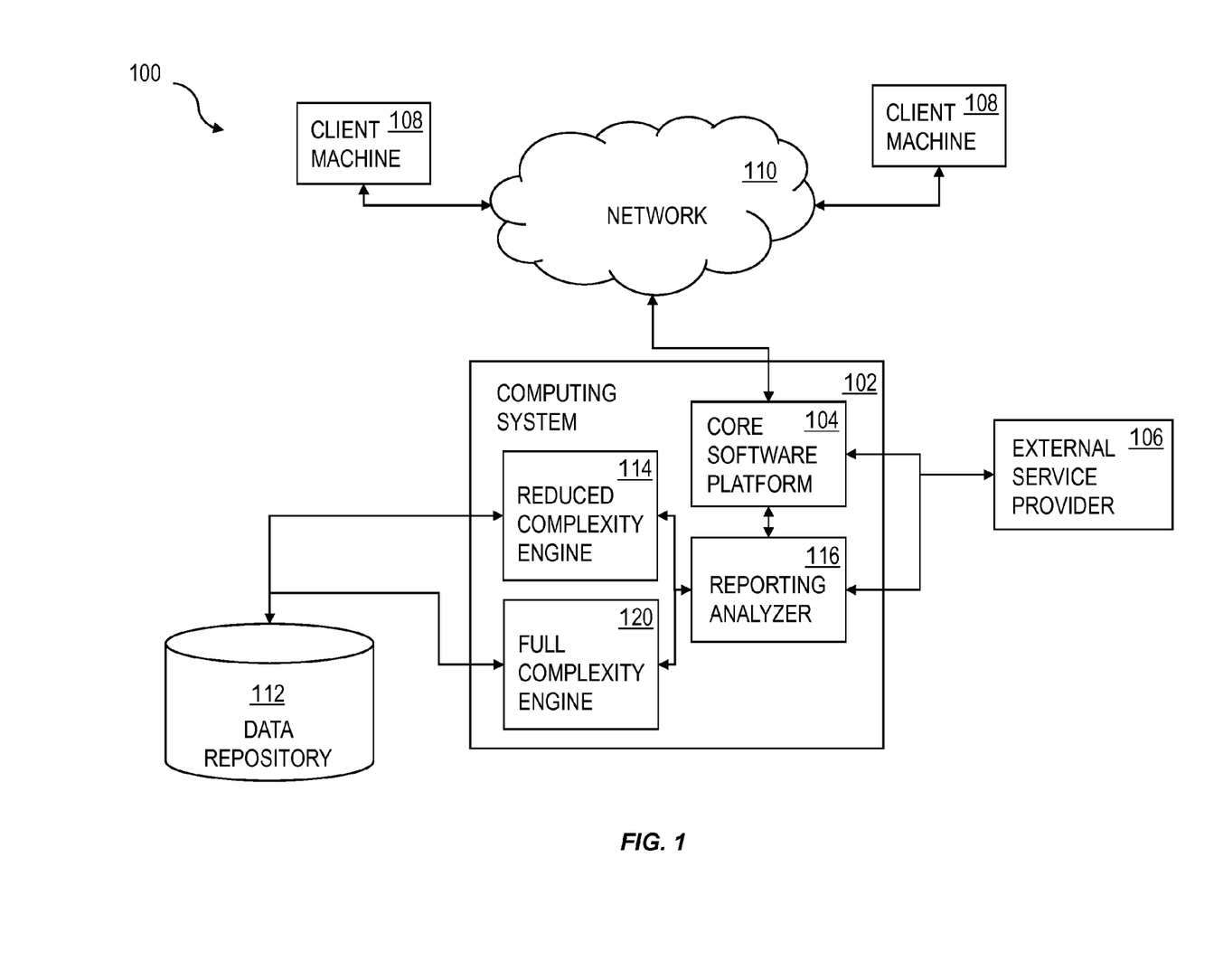
FIG. 1 is a diagram illustrating aspects of a system showing features consistent with implementations of the current subject matter.

Introduction of at least one additional, simplified reporting stack in parallel to the OLAP engine or other multidimensional query response model (hereinafter referred to as a full complexity analytical engine) can support functionality as discussed above. FIG. 1 shows a block diagram illustrating features of a business software framework consistent with implementations of the current subject matter. In the example of FIG. 1, the business software framework can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible.

As shown in FIG. 1, a computing system 102 can include one or more core software platform modules 104 (or other computing functionality) providing one or more features of the business software system. The computing system 102 can also aggregate or otherwise provide a gateway via which users can access functionality provided by one or more external service providers 106. Client machines 108 can access the computing system 102, either via a direct connection, a local terminal, or over a network 110 (e.g. a local area network, a wide area network, a wireless network, the Internet, or the like). The one or more core software platform modules 104 can provide user interfaces, access to data stored in one or more repositories 112, and other feature consistent with the needs of customer organizations, business users, etc. using the business software framework.

The simplified reporting stack (referred to herein as a reduced reporting engine 114) discussed above can implement only a subset of analytical features and can be performance optimized for this subset of features. A reporting analyzer 116 can parse each reporting request received from the core software platform modules 104, from an external service provider 106, or from other data consumers and can decide whether a full complexity analytical engine 120 is needed to fulfill the request. If the reporting analyzer 116 determines that the full complexity analytical engine 120 is not required, the reduced reporting engine 114 can be used to reduce the memory consumption and the overall runtime. While only two analytical engines (the reduced complexity analytical engine 114 and the full complexity analytical engine 120 are shown in FIG. 1, it will be readily understood that three of more reporting engines at differing levels of complexity can be included consistent with implementations of the current subject matter. For purposes of the discussion herein, relevant features will be discussed in reference to an arrangement with two reporting engines of differing complexity and analytical feature sets. This discussion should not be construed as limiting on the scope of the claims that follow this description.

Consistent with implementations of the current subject matter, the most advanced (e.g. highest complexity) analytical reporting engine can define the complete scope of analytical features available to a user or other consumer of features of the business software framework. Accordingly, seamless switching between different levels of use of the provided reporting engines is supported. The use of multiple analytical reporting engines can eliminate a need to specify complex combinations of analytical requirements. The full complexity analytical engine 120 is present as a fallback scenario if the requirements of a query are not satisfied by the capabilities of a reduced complexity analytical engine 114. However, by targeting maximum use of the reduced complexity analytical engine 114 whenever the nature of a query allows it, for example in relatively limited use cases such as list-like reporting, highly aggregated key performance indicator (KPI) calculations, etc., the runtime load for generating a report can be significantly reduced in many cases.

As noted above, the reporting analyzer 116 can make a determination regarding which of two or more analytical reporting engines. This determination can, consistent with some implementations of the current subject matter, be based on a list of functions like, which can optionally include one or more of currency conversion, calculation, restrictions, hierarchies, temporal joins, master data attributes, complex sorting, exceptional aggregation, list calculation, and the like.

Figure 2:
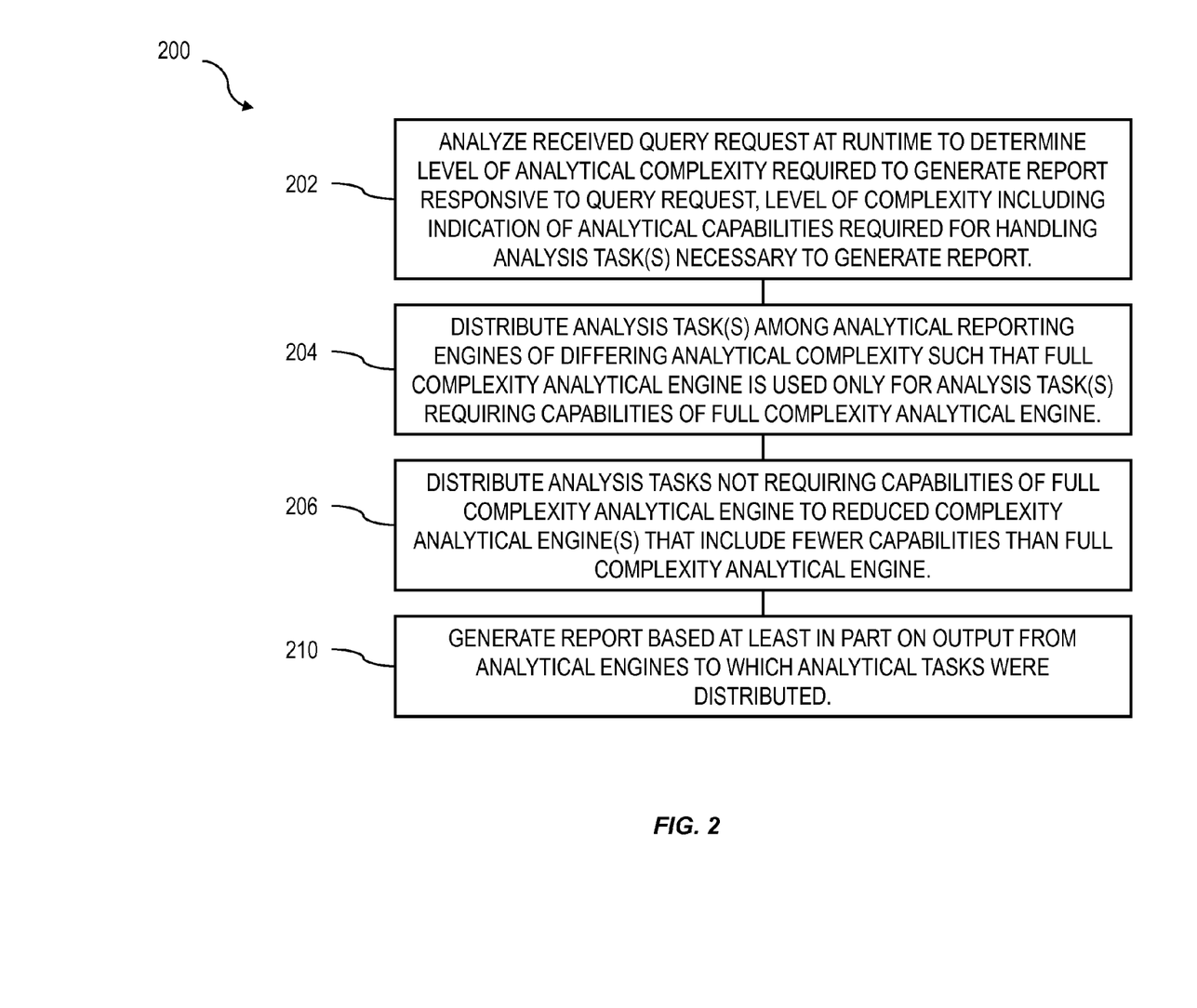
FIG. 2 is a process flow diagram illustrating aspects of a method having one or more features consistent with implementations of the current subject matter.

FIG. 2 shows a process flow chart 200 that illustrates features of a method. One or more of these features can be present in various implementations of the current subject matter. A query request is received, for example by a business software framework that includes a reporting analyzer 116. At 202, the query request is analyzed at runtime to determine a level of analytical complexity required to generate a report responsive to the query request. The determined level of analytical complexity includes an indication of the analytical capabilities required for handling one or more analysis tasks necessary to generate the report. The query request is distributed at 204 among a plurality of analytical reporting engines of differing analytical complexity such that a full complexity analytical engine 120 of the plurality of analytical reporting engines is used only for those of the one or more analysis tasks that require capabilities of the full complexity analytical engine 120. Those of the one or more analysis tasks that do not require capabilities of the full complexity analytical engine 120 are distributed to one or more reduced complexity analytical engines 114 of the plurality of analytical reporting engines at 206. At 210, the report is generated based on output from each of the plurality of analytical engines to which the one or more analytical tasks were distributed.

In some examples, the distributing occurs such that initiation of the full complexity analytical engine 120 does not occur unless at least one task of the one or more analytical tasks requires capabilities of the full complexity analytical engine 120. In other words, the runtime analysis of the query request can be performed without initiating the full complexity analytical engine 120.

As noted above, avoidance of use of the full complexity analytical engine 120 whenever possible can be advantageous from a runtime performance standpoint. In conventional approaches, a full complexity analytical engine is typically used for parameter screen processing, for example for tasks such as responding to a request for a business intelligence consumer services (BICS) query view (e.g. a client or application-like access to the data) when requested at instantiation of a reportable object (e.g. a data structure supporting generation of a report). The possible values for variables of a parameter screen can be provided by a query to the analytical engine. In some case, provision of these variables can require complex analytical capabilities, such as for example a time dependent organization hierarchy (e.g. an assignment of internal roles within an organization that can vary over time), or the like. In a conventional approach, an OLAP engine typically provides the parameter screen with all functions. To avoid the performance overhead penalty that can result from this approach, implementations of the current subject matter can include first analyzing the parameter capabilities and, if possible, waiting to perform further processing until a user processes a value help. Only at that time would a full complexity analytical engine 120 (e.g. an OLAP engine) be initiated. In some cases, it can be necessary to initiate the full complexity analytical engine 120, for example if parameter values are calculated directly upon the start of a report or if they depend on each other. A BICS variable container can be kept synchronously with the parameter screen.

As used herein, a variable handler can refer to an object that provides consistent values of all variables of the reports. There can be "hidden" variables beside the parameters of the parameter screen.

In contrast, in implementations of the current subject matter, whenever a user calls a parameter value help, parameter values for the query request can be transferred to a variable container or other buffer. In an example, the variable container can be a BICS variable container. When the user submits a parameter screen, a business intelligence variable handler can be submitted. A "lazy" BICS can be supported in both of the reportable object and the parameter handler. In other words, these services can be instantiated only as needed rather than automatically upon receipt of a query. Value help restrictions can be determined based on metadata objects that include definitions of the structure of business objects or other data structures for presenting and accessing data from the database 112.

Figure 3:
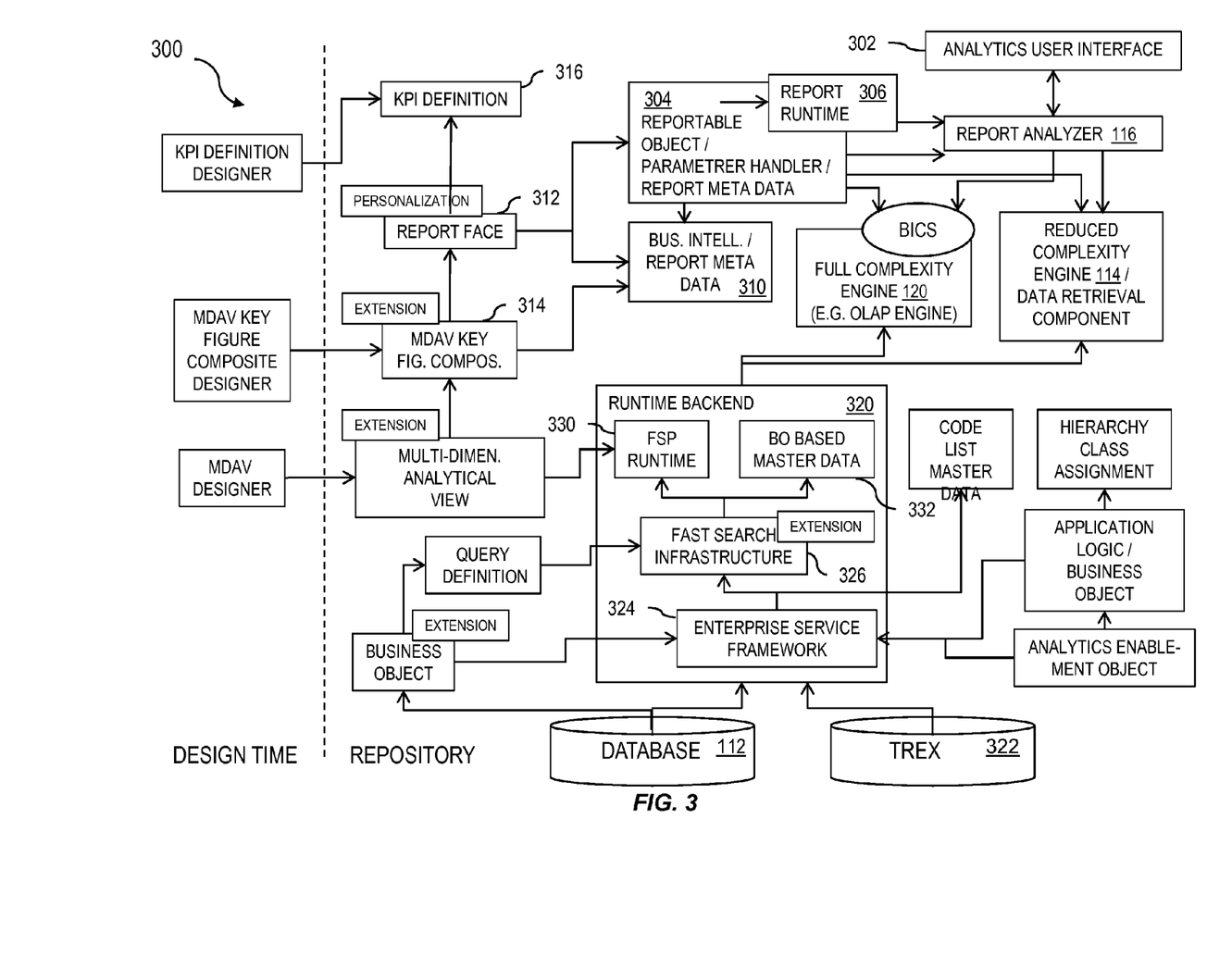
FIG. 3 is a diagram illustrating aspects of a software architecture having one or more features consistent with implementations of the current subject matter.

FIG. 3 shows a diagram of a system architecture 300 illustrating features of example implementations of the current subject matter. Such a system architecture 300 can include design time components and repository components, several of which are instantiated at runtime. A user can create (formulate, generate, etc.) a query using an analytics user interface 302. Queries can also be generated by other applications or software solutions, such as for example those of external service providers, entities that consume data via web services, or the like. A report analyzer 116 or similar interface or adapter functionality can receive query inputs, and can perform one or more of the above-discussed functions with regards to analyzing a query request. The report analyzer 116 can alternatively be referred to as a central user interface adaptor for analytics. As discussed above, the report analyzer 116 can distribute analytical tasks associated with generating a report responsive to the query among tow or more analytical engines: a full complexity analytical engine 120 and a reduced complexity analytical engine 114. The full complexity analytical engine 120 can include BICS capabilities. Functionality supporting operation of the report analyzer 116 and the full complexity analytical engine 120 can include one or more reporting data structures 304, which can include one or more of a reportable object, a parameter handler, report meta data, or the like, and which can support a report runtime 306. Capabilities such as business intelligence, report meta data, etc. 310 can also be provided. These data structures can be supported by report face definitions 312, multidimensional analytical view (MDAV) key figure composites (MKFCs) 314, and the like, each of which can be personalized or extended per the needs of a customer organization or user of the business software framework. Report faces 312 can rely upon key performance indicators 316, among other possible features. Deign time design structures can correspond to one or more of these features.

A runtime backend 320 can supply access to data in one or more databases 112 and to one or more search engines 322, such as for example a text retrieval and information extraction (TREX) engine. The runtime backend 320 can include one or more of an enterprise service framework (ESF) 324; a fast search infrastructure (FSI) 326, which can also include extensions; a file service protocol (FSP) runtime 330; and business object based mater data 332.

An implementation of parameter value help can rely on instances of BICS variables or information objects, which can be retrieved via a BICS variable container as discussed below. In an example, BICS information object instances can be exposed via a parameter handler or comparable functionality, for example to obtain parameter value help restrictions, and for parameter exit implementations, for example to allow applications to react on these restrictions. In this manner, restrictions, dependencies, etc. for parameter values (e.g. due to characteristics compounding) can be determined by the BICS variable container.

A value help implementation of a business software framework can make use of an instance of a BICS information object instance to determine characteristic values. In an example in which the value help is requested for a hierarchy node parameter, the hierarchy can be retrieved from the BICS characteristic. In an example, a method can be used to find hierarchy nodes. Stated another way, value help restrictions can be determined based on meta data objects.

A parameter handler can hold parameter values in an internal format. The parameter screen, however, can present to the user values in external format or texts. Conversion of characteristic values between internal and external formats can be completed in some examples by a function module, which can use as inputs business warehouse object meta data. Similarly, determination of texts for characteristic values can be completed via other functions. I this manner, internal to external format conversion can be completed, and master data access can be provided.

As noted above, consistent with implementations of the current subject matter, simple reports can advantageously be run without invoking a full complexity analytical engine 120. In conventional approaches, a full complexity analytical engine 120 is more typically used to retrieve report data for all types of reports.

Direct access to an MDAV layer or below (e.g. in a calculation scenario) can be used to avoid the use of business intelligence capabilities and to thereby increase performance. Such a feature can be realized for reports, views, etc. that can be characterized as "simple." To avoid the use of business intelligence features or other more complex analytical capabilities that can require initiation of a full complexity analytical engine 120, report meta data 310 can be exposed by a reportable object 304. The report meta data 310 can be assembled by the report face 312 and all referenced MKFCs 314 (e.g. MKFC key figure structure, RKFs, CKFs, RRO) and personalization information. The report meta data 310 can be represented in a way that can be easily analyzed by a reduced complexity runtime.

As noted above, a report analyzer 116, which executes during runtime, can decide whether a full complexity analytical engine 120 (e.g. an OLAP engine) is required to generate parte all or part of a report to respond to a query. This determination can be performed for each task added to a query built by a user or other activity that adds complexity to the request. Of example, complexity can increase with additional user interactions (e.g. by putting a character on rows, by creating a condition, etc.).

Consistent with some implementations of the current subject matter, if the full complexity analytical engine 120 is determined to be required in one request the decision is final and will not be changed any more. As such, once the full complexity analytical engine 120 is initiated and the associated overhead incurred, the full complexity analytical engine 120 can be used for handling of any level of analytical task complexity.

A data retrieval component, which can be a very simple example of a reduced complexity analytical engine 114, can generate a static execution plan based on given report metadata. The execution plan can depend on the given MDAV type(s) and database systems. The static execution plan can be adjusted based on the given view (e.g. MKFC display setting) and selection (e.g. variant/input parameter handler). The adjusted execution plan can be executed and the data retrieval component can collect the intermediate result sets incl. time and/or language depended attributes and texts and assemble the result set.

A report definition, which under a conventional approach would be forwarded as a query (e.g. a business intelligence query) to a full complexity analytical engine (e.g. an OLAP engine) can be assembled from various MKFC objects, such as for example a report face 312, optionally a key figure structure or grid (optionally with a reusable restriction object), where the report face 312, the key figure structure or grid, etc. can reference multiple reusable key figure components (RKF/CKF), which in turn can reference other RKFs/CKFs. Additionally personalization data of all users can be taken into account.

If the report is not processed by the full complexity engine, a similar definition can be required by the reduced complexity analytical engine, which can be an assembly from all these entities ready for consumption by the runtime. In analogy to MDAV runtime meta data, this definition can be referred to as report runtime meta data. Report runtime meta data can be exposed as public, read-only attributes of the reportable object 304, can depend only on meta data which are currently used for query generation (i.e. it can/will be cached/invalidated in a similar way as the query, such as for example via a load cache type element), can have all MKFC references resolved (i.e. the definition can represent the fully assembled, self contained report, etc. The Report runtime meta data can be used for determination of value help restrictions for UI parameters, for the runtime report analyzer to decide if the reduced complexity analytical engine 114 can be used, and by the reduced complexity analytical engine 114 (e.g. to build the execution plan). Report runtime meta data can have the following data structure, which can be expressed in terms of MKFC Nodes (where indentation should represent composition association) [MKFC]: one root, components numbering 1-n, restrictions numbering 0-n, hierarchy restriction numbering 0-n, formula steps numbering 0-n, parameters numbering 0-n, restrictions numbering 0.-n, hierarchy restrictions numbering 0-n, characteristics numbering 0-n, and the like.

The single root node can be the root node of the report Face with specific information (e.g. key date) coming from other involved root nodes (e.g. a key date coming from a referenced MKFC KeyFigureStructure/Grid). Individual component nodes can be created for each component contained in the report face 312, in a referenced key figure structure/grid (if applicable) and each referenced RKF/CKF (recursively). A "hidden" attribute of the component node is set to true if a component has been added for a referenced RKF/CKF to indicate that the component is not available for display. References to RKFs/CKFs can be replaced by references to the component, which has been created for this RKF/CKF.

Each component can hold the Restriction/hierarchy restriction, or formula step nodes, which make up its definition (e.g. for component type="selection" or "formula" respectively). Since all MKFC references can be resolved, a formula step node need not have an operand of type RKF/CKF. A single component of a usage type "global" can be used to hold restriction/hierarchy restriction nodes which represent the global restrictions. Global restrictions can be collected from the report face 312, key figure structure/grid, and reusable restriction object (if applicable).

A parameter node can be present for each user input parameter found in all involved MKFCs, which need to expose restrictions for parameter value help. These restrictions can be represented in restriction/hierarchy restriction nodes below the parameter node.

Characteristics relevant for the report (including report personalization of all users) can be listed in the characteristic node of report runtime meta data. By providing this information, a runtime is able to generate and cache runtime artifacts which are independent of the current user.

For assembling the report runtime meta data, the parsing of the MKFC model already implemented for the query generation can be reused. In each method for processing a specific MKFC node, a call to a method which adds this node to the report meta data can be called.

Report runtime meta data can, consistent with implementations of the current subject matter, continue to contain all references to parameters and exit members. Otherwise, such data could not be cached. When report runtime meta data is used by the runtime of the reduced complexity analytical engine 114, parameters and exit members can need to be resolved. For this purpose a new method can be added in the reportable object 304, which receives a list of selected components (only non-hidden components allowed) and returns their definition, with all parameters and exit members replaced by current values. If the definition contains references to hidden components, these can be returned as well. Implementation including this approach can be reused by the parameter handler for the determination of parameter value help restrictions.

In some implementations of the current subject matter, additional information can be included in the report runtime meta data to allow the report runtime analyzer to judge the complexity of the requested report without traversing all data necessary to respond to generate the report. For example, this additional information can include one or more of a list of all formula operators; a list of all used local calculation features, or the like.

The reportable object and parameter handler 304 do not play an active role in deciding whether a reduced complexity analytical engine 114 is used in responding to a query request. As such, these entities do not need to support both a runtime for the reduced complexity analytical engine 114 and a runtime for the full complexity analytical engine 120. Therefore additional overhead can be minimized. The creation and provisioning of report runtime meta (which is not needed when the full complexity analytical engine 120 is used) can be very efficient (static read-only attribute; buffering with BI Query, etc.). Hence, avoidance of usage of the full complexity analytical engine 120 by lazy instantiation of the corresponding objects can be desirable.

Interfaces for the reportable object and input parameter handler can be already designed in a way that it is known if a BICS query view and a BICS variable container are needed or not. As such, BICS can be required in at least some implementations of the current subject matter only if value help restrictions can be requested from an input parameter handler with an explicitly requested export parameter BICS characteristic. A BICS query view can be requested from the reportable object. Advantageously, the reportable object and the parameter handler can create instances of a BICS query view and a BICS variable container in a "lazy" way (i.e. only if they are needed). If instances of a BICS query view and a BICS variable container are not requested, BICS can advantageously not be invoked at all.

Lazy BICS usage can be achieved by refactoring of the implementations of the reportable object and the parameter handler. Calls involving BICS objects can be deferred to the latest point in time. If no BICS query view is requested and no BICS characteristic is needed for Parameter Value help, BICS is not used at all. This way, Reportable Object and Parameter Handler automatically do the right thing regarding BICS Usage.

Consistent with some implementations of the current subject matter, value help for a parameter can offer only those values, which are reasonable for the report. In other words, value help restrictions need to be evaluated. Restrictions for parameter value help can originate from, for example, compounding characteristics (e.g. value help for a parameter "region" should consider a global restriction such as "country=Germany"). Such restrictions can need to be derived directly from the model data available in meta data objects (for example in particular characteristic compounding information in MDAV, and restrictions in MKFC). Respecting these restrictions, implementation of value help can require accessing the MDAV layer directly.

In some implementations of the current subject matter, the decision whether a full complexity analytical engine 120 is required or not can be based on the report runtime meta data as well as on the current view. In case the report runtime meta data does not allow using the reduced complexity analytical engine 114, the view need not be checked further. In case the decision is based on the view before each execution, the report analyzer 116 can be required to check if the full complexity analytical engine 12 is required or not.

Checks based on report runtime meta data can include one or more of the following: report type is not supported (e.g. Grids), hierarchy node selection, classification of components (which can be handled by a data retrieval component or other reduced complexity analytical engine 114), checks based on a current view, characteristic moved to rows, rendering settings, active display or universal hierarchy, sorting on display attributes, conditions and/or exceptions, a requested component can not be handled by the reduced complexity analytical engine 114. As different entities can require a full complexity analytical engine processor, the runtime analyzer can also be required to ensure a decentralized analysis of the request.

A reduced complexity analytical engine 114, such as for example a data retrieval component can optionally include a static execution plan. The data retrieval component can create, based on the provided report runtime meta data as well as the current database system, an execution plan regarding how the request can be executed. An optimization goal of the data retrieval component can be to push down the functionality to the database layer as much as possible. If this is not possible (e.g. MDAV cannot be executed with the calcview runtime, etc.) or the calculations or restrictions of the provided components cannot be executed by the calc view runtime, a business software framework runtime (e.g. an ABAP runtime) can be used to cover these features also.

In case the data retrieval component cannot handle all components of the report, the static execution plan can be calculated for the subset of analytical tasks that the data retrieval component can handle. If a component is requested that cannot be handled by the data retrieval component, the report analyzer 116 can ensure that this request is handle by the full complexity analytical engine 120 processor instead of the data retrieval component.

The subset of steps from the static execution plan necessary to fulfill the current request (determined on the MKFC display setting) can next be determined. The current selection can be derived from the input parameter handler and the reportable object metadata.

Plan execution can be handled in several processes. First, a result can be retrieved a based on transactional provider including key figures. Display attributes and texts can also be retrieved. Subtotals can be calculated and texts and display attributes can be rendered.

The business software framework of FIG. 1 can work well for applications in which a business software framework or the like is provided as a standalone, customized software installation that runs on one or more processors that are under the control of the organization (e.g. either co-located at a facility owned or operated by the organization, located at a server farm or other installation remote from but under the control of the organization, etc.). This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 4:
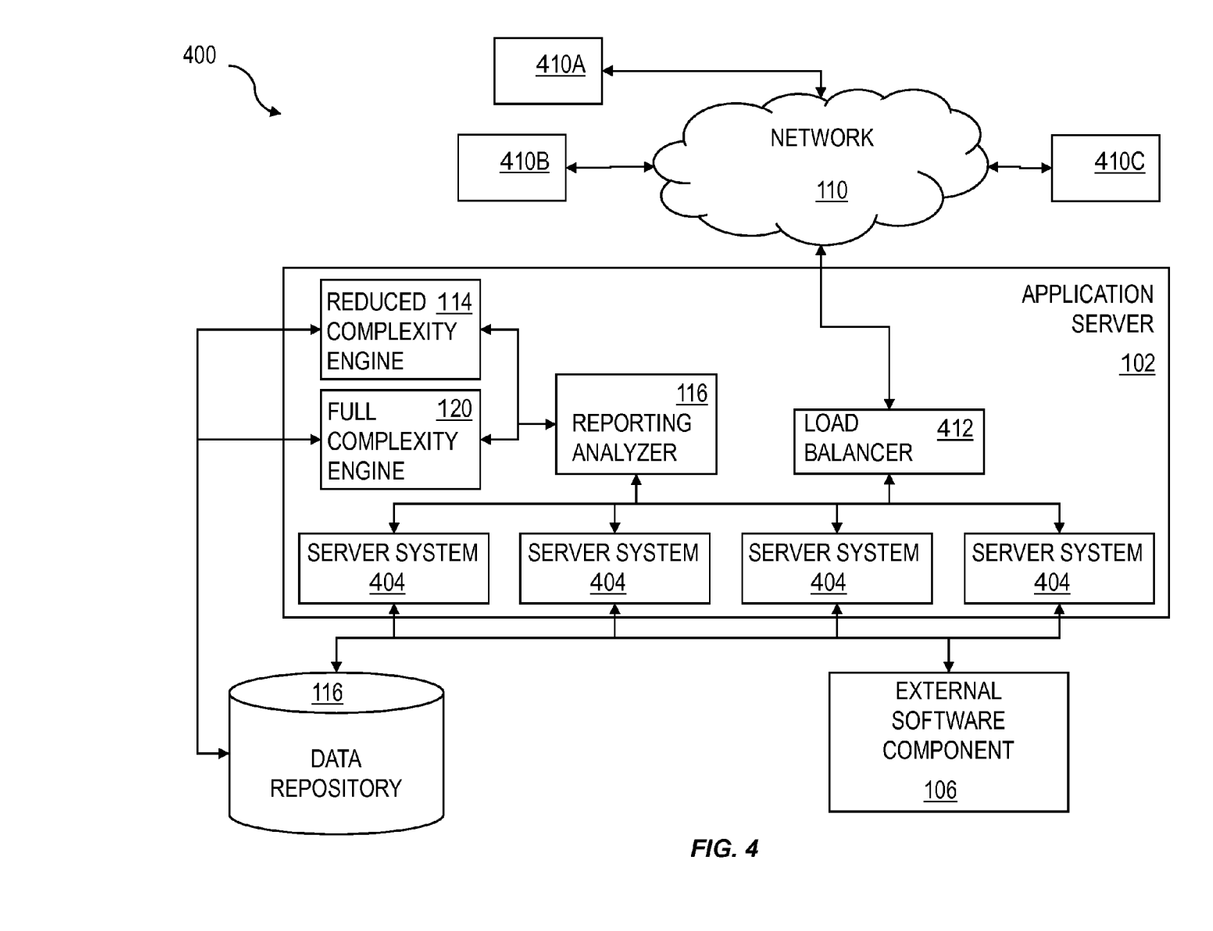
FIG. 4 is a diagram illustrating aspects of another system showing features consistent with implementations of the current subject matter.

FIG. 4 shows a block diagram of a multi-tenant implementation of a software delivery architecture 400 that includes an application server 402, which can in some implementations include multiple server systems 404 that are accessible over a network 406 from client machines operated by users at each of multiple organizations 410A-410C (referred to herein as "tenants" of a multi-tenant system) supported by a single software delivery architecture 400. For a system in which the application server 402 includes multiple server systems 404, the application server can include a load balancer 412 to distribute requests and actions from users at the one or more organizations 410A-410C to the one or more server systems 404. Instances of the core software platform 104 (not shown in FIG. 4) can be executed in a distributed manner across the server systems 404. A user can access the software delivery architecture across the network using a thin client, such as for example a web browser or the like, or other portal software running on a client machine. The application server 402 can access data and data objects stored in one or more data repositories 112 and the core software platform modules on the server system 404 can provide user interfaces, access to data stored in one or more repositories 112, and other feature consistent with the needs of customer organizations, business users, etc. using the business software framework. The application server 402 can also serve as a middleware component via which access is provided to one or more external software components 106 that can be provided by third party developers in a, aner similar to that describe din reference to FIG. 1.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 402 that includes multiple server systems 404 that handle processing loads distributed by a load balancer 412. Potential benefits from such an arrangement can include, but are not limited to, high and reliably continuous application server availability and minimization of unplanned downtime, phased updating of the multiple server systems 404 to permit continuous availability (one server system 404 can be taken offline while the other systems continue to provide services via the load balancer 412), scalability via addition or removal of a server system 404 that is accessed via the load balancer 412, and de-coupled lifecycle processes (such as for example system maintenance, software upgrades, etc.) that enable updating of the core software independently of tenant-specific customizations implemented by individual tenants.

As in the example illustrated in FIG. 1, a reporting analyzer 116 can parse each reporting request received from the core software platform modules 104, from an external service provider 106 (not shown with lines in FIG. 4 for simplicity), or from other data consumers and can decide whether a full complexity analytical engine 120 is needed to fulfill the request. If the reporting analyzer 116 determines that the full complexity analytical engine 120 is not required, a reduced reporting engine 114 can be used to reduce the memory consumption and the overall runtime. Also as noted above, the reduced reporting engine 114 can implement only a subset of analytical features and can be performance optimized for this subset of features.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A non-transitory computer program product comprising a machine-readable medium storing instructions that, when executed by at least one programmable processor, cause the at least one programmable processor to perform operations comprising:
    receiving a query request from a single user interface via which a user selects a desired set of analytical functions from a presented full range of levels of analytical complexity supported by the plurality of analytical reporting engines;
    analyzing the received query request at runtime to determine a level of analytical complexity required to generate a report responsive to the query request;
    distributing, based on the determined level of analytical complexity, the one or more analysis tasks among a plurality of analytical reporting engines of differing analytical complexity such that a full complexity analytical engine of the plurality of analytical reporting engines is used only for those of the one or more analysis tasks that require capabilities of the full complexity analytical engine;
    distributing, based on the determined level of analytical complexity, those of the one or more analysis tasks that do not require capabilities of the full complexity analytical engine to one or more reduced complexity analytical engines of the plurality of analytical reporting engines, the one or more reduced complexity analytical reporting engines comprising fewer capabilities than the full complexity analytical engine; and
    generating the report based at least in part on output from each of the plurality of analytical engines to which the one or more analytical tasks were distributed.

2. A non-transitory computer program product as in claim 1, wherein the full complexity analytical engine comprises at least one of a multidimensional model and an online analytical processing (OLAP) engine.

3. A non-transitory computer program product as in claim 1, wherein the determined level of analytical complexity comprises an indication of the analytical capabilities required for handling one or more analysis tasks necessary to generate the report.

4. A non-transitory computer program product as in claim 1, wherein the generating of the report consumes fewer runtime resources than would be consumed were the report generated using only the full complexity analytical engine.

5. A non-transitory computer program product as in claim 1, wherein the analyzing occurs without initiating the full complexity analytical engine.

6. A system comprising:
at least one programmable processor; and
a machine-readable medium storing instructions that, when executed by the at least one processor, cause the at least one programmable processor to perform operations comprising:
receiving a query request from a single user interface via which a user selects a desired set of analytical functions from a presented full range of levels of analytical complexity supported by the plurality of analytical reporting engines;
analyzing the received query request at runtime to determine a level of analytical complexity required to generate a report responsive to the query request;
distributing, based on the determined level of analytical complexity, the one or more analysis tasks among a plurality of analytical reporting engines of differing analytical complexity such that a full complexity analytical engine of the plurality of analytical reporting engines is used only for those of the one or more analysis tasks that require capabilities of the full complexity analytical engine;
distributing, based on the determined level of analytical complexity, those of the one or more analysis tasks that do not require capabilities of the full complexity analytical engine to one or more reduced complexity analytical engines of the plurality of analytical reporting engines, the one or more reduced complexity analytical reporting engines comprising fewer capabilities than the full complexity analytical engine; and
generating the report based at least in part on output from each of the plurality of analytical engines to which the one or more analytical tasks were distributed.

7. A system as in claim 6, wherein the full complexity analytical engine comprises at least one of a multidimensional model and an online analytical processing (OLAP) engine.

8. A system as in claim 6, wherein the determined level of analytical complexity comprises an indication of the analytical capabilities required for handling one or more analysis tasks necessary to generate the report.

9. A system as in claim 6, wherein the generating of the report consumes fewer runtime resources than would be consumed were the report generated using only the full complexity analytical engine.

10. A system as in claim 6, wherein the analyzing occurs without initiating the full complexity analytical engine.

11. A computer-implemented method as in claim 6, wherein the full complexity analytical engine comprises at least one of a multidimensional model and an online analytical processing (OLAP) engine.

12. A computer-implemented method comprising:
receiving, by at least one processor, a query request from a single user interface via which a user selects a desired set of analytical functions from a presented full range of levels of analytical complexity supported by the plurality of analytical reporting engines;
analyzing, by the least one processor, the received query request at runtime to determine a level of analytical complexity required to generate a report responsive to the query request;
distributing, by the least one processor and based on the determined level of analytical complexity, the one or more analysis tasks among a plurality of analytical reporting engines of differing analytical complexity such that a full complexity analytical engine of the plurality of analytical reporting engines is used only for those of the one or more analysis tasks that require capabilities of the full complexity analytical engine;
distributing, by the least one processor and based on the determined level of analytical complexity, those of the one or more analysis tasks that do not require capabilities of the full complexity analytical engine to one or more reduced complexity analytical engines of the plurality of analytical reporting engines, the one or more reduced complexity analytical reporting engines comprising fewer capabilities than the full complexity analytical engine; and
generating, by the at least one processor, the report based at least in part on output from each of the plurality of analytical engines to which the one or more analytical tasks were distributed.

13. A computer-implemented method as in claim 12, wherein the determined level of analytical complexity comprises an indication of the analytical capabilities required for handling one or more analysis tasks necessary to generate the report.

14. A computer-implemented method as in claim 12, wherein the generating of the report consumes fewer runtime resources than would be consumed were the report generated using only the full complexity analytical engine.

15. A computer-implemented method as in claim 12, wherein the analyzing occurs without initiating the full complexity analytical engine.

16. A computer-implemented method as in claim 12, further comprising promoting the generated report.

17. A computer-implemented method as in claim 12, wherein at least one of the analyzing, the first distributing, the further distributing, and the generating are performed by at least one programmable processor.

* * * * *